April 14, 1925.
A. P. SCHEIN
1,533,342
FLOWERPOT
Filed May 25, 1923
2 Sheets-Sheet 1
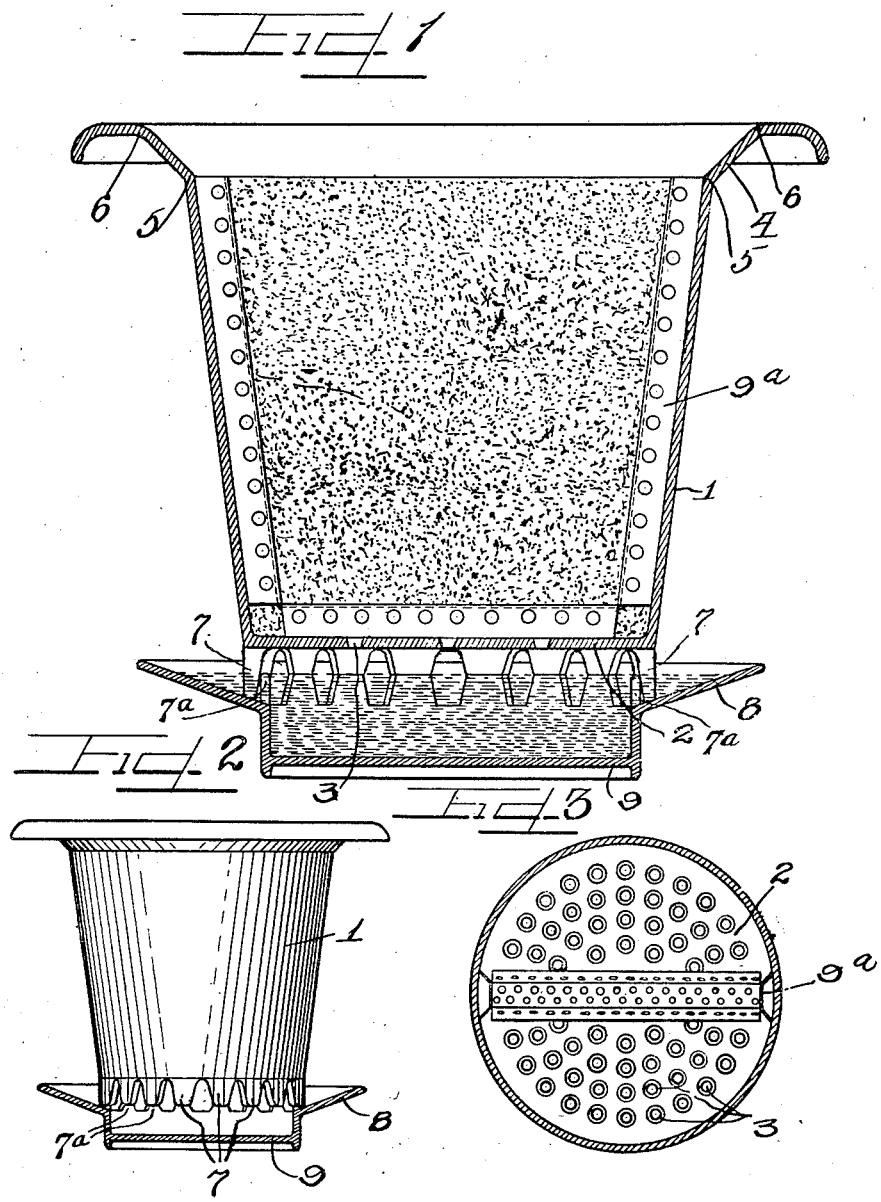

April 14, 1925.
A. P. SCHEIN
FLOWERPOT
Filed May 25, 1923
1,533,342
2 Sheets-Sheet 2
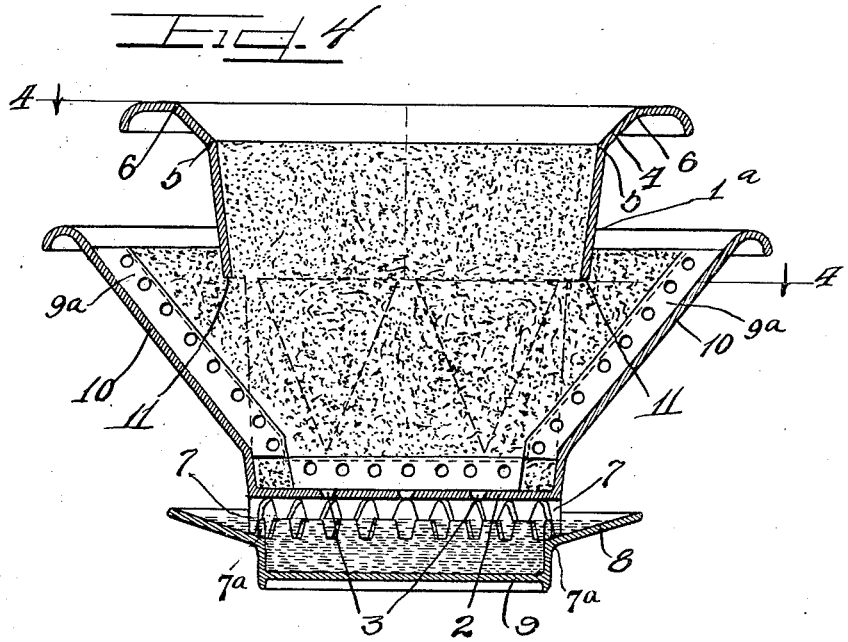
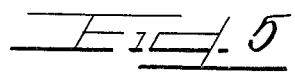
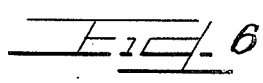
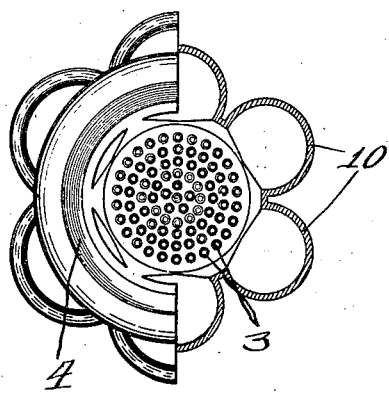
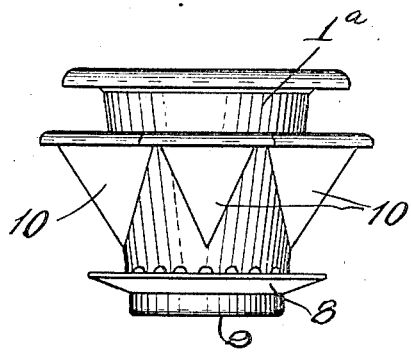

Patented Apr. 14, 1925.

1,533,342

UNITED STATES PATENT OFFICE.

AUGUST P. SCHEIN, OF CHICAGO, ILLINOIS.

FLOWERPOT.

Application filed May 25, 1923. Serial No. 641,336.

*To all whom it may concern:*

Be it known that I, AUGUST P. SCHEIN, a citizen of the United States, and a resident of the city of Chicago, in the county of Cook and State of Illinois, have invented certain new and useful Improvements in a Flowerpot; and I do hereby declare that the following is a full, clear, and exact description of the same, reference being had to the accompanying drawings, and to the numerals of reference marked thereon, which form a part of this specification.

This invention relates to a flower pot.

It is an object of this invention to provide a flower pot having a novel form of drainage in combination with a supporting base to receive the drainage that will direct the evaporation of the drainage back into the flower pot. It is also an object of this invention to provide a flower pot having a known watering level.

With these and other objects in view which will become more apparent in the following description and disclosure, this invention comprises the novel mechanism and combinations hereinafter described and more particularly pointed out and defined in the appended claims.

In the accompanying drawings which illustrate certain preferred embodiments of this invention and in which similar numerals refer to similar features in the different views:

Figure 1 is a central vertical section through the flower pot filled with soil and a supporting tray therefor involving my invention.

Figure 2 is an elevational view of the flower pot with the tray in section upon a reduced scale.

Figure 3 is a section through the empty flower pot upon an enlarged scale with reference to Figure 2 illustrating the perforations.

Figure 4 is a central vertical section through a modified form of flower pot and supporting tray.

Figure 5 is a section upon the line 4—4 of Figure 3 upon a reduced scale, the channel member 9ª being omitted.

Figure 6 is an elevational view of the modified form of flower pot and tray upon a reduced scale.

As shown on the drawings: In referring to Figures 1 to 3 of the drawings, which illustrate one embodiment of this invention, it will be observed that the illustrated flower pot comprises a frusto-conical body portion 1 having a base 2 which is provided with a plurality of perforations 3 in order to provide a through drainage and prevent the usual over-saturation of the soil in the flower pot. The frusto conical body portion 1 terminates at its upper end in a flaring portion 4 between the points 5 and 6 which define the watering capacity for a proper moistening of the soil, so that too much water will not be poured into the flower pot. From the point 6, the rim of the flower pot extends horizontally and flares downwardly so that the circumference defined by the point 6 is substantially the upper limit of the watering capacity, and it would be impossible to add more than the predetermined quantity of water determined by the points 5 and 6. The body portion 1 of the flower pot, is supported upon a plurality of circumferentially spaced short feet 7 which depend from the lower circumferential periphery of the flower pot and engage over registering lugs 7ª projecting upward from the inner edge of the upwardly and outwardly inclined rim 8 of a water containing tray 9, said lugs effectually preventing any lateral shift of the flower pot.

It will be apparent that the water for watering the plants in the flower pot can readily seep through the contained soil on account of the character of the bottom of the pot and drain into the tray 9 where it will collect and evaporate; the moist vapors of which, rising through the perforations and diffusing through the soil, maintain the same always in a moist condition, or a fluid may be put into the tray for evaporating and moistening the soil of the flower pot.

Further ventilation may be afforded by a perforated channel member 9ª which is U-shaped and which is inserted in the body portion 1, as illustrated in Figures 1 and 3, to permit circulation of the air along the side wall and bottom thereof and through the apertures into the soil.

In Figures 4 to 6 there is illustrated a flower pot 1ª which differs from the foregoing described one in that there are provided circumferentially spaced auxiliary chambers 10 extending in an upwardly inclined direction from the outer periphery of the central main chamber, but terminating below the top of said main chamber.

These auxiliary chambers 10 which are in the form of lateral tapering pockets communicate with the main chamber through proper openings 11 formed in the wall of the main chamber. The main chamber is provided at its upper end with the predetermined watering capacity defined by the points 5 and 6 as in the first described form, and the bottom is similarly perforated and supported upon the flange 8 of the tray 9 as before described.

The auxiliary chambers 10 are adapted for growing plants or flowers, just as the main central chamber, and with this construction a variety of different plants or flowers may be grown and nursed to present a pleasing effect or array in a limited space.

I am aware that numerous details of construction may be varied through a wide range without departing from the principles of my invention and I therefore do not purpose limiting the patent granted otherwise than necessitated by the prior art.

I claim as my invention:

1. A flower pot, comprising a frusto conical body portion having a perforated bottom and depending legs, and an integral perforated channel member shaped to fit the sides and bottom of said body portion and removably inserted therein, said member forming in conjunction with the body portion walls a continuous conduit.

2. A flower pot, comprising a frusto conical circular central chamber, and a plurality of separate circumferentially spaced auxiliary chambers having symmetrically curved walls, said walls merging into the wall of the central chamber, and said chamber communicating with said central chamber, the upper edges of said auxiliary chambers being in the same plane but in a plane below that of the upper edge of said central chamber.

In testimony whereof I have hereunto subscribed my name in the presence of two subscribing witnesses.

AUGUST P. SCHEIN.

Witnesses:
CARLTON HILL,
OSCAR HARTMANN.